Patented Mar. 26, 1929.

1,706,981

UNITED STATES PATENT OFFICE.

RALPH N. LULEK, OF WILMINGTON, DELAWARE, ASSIGNOR TO E. I. DU PONT DE NEMOURS & COMPANY, OF WILMINGTON, DELAWARE, A CORPORATION OF DELAWARE.

INTERMEDIATE OF THE 1:9-ANTHRATHIAZOLE SERIES.

No Drawing.   Application filed March 18, 1927.   Serial No. 176,578.

This invention relates to the development of a new intermediate of the anthraquinone series. More particularly it relates to the process and the product resulting from fusing an anthraquinone compound with polysulphide and ammonia.

The process for making cyclic anthraquinone derivatives containing sulphur and nitrogen is known. These compounds are made by heating, with polysulphides and ammonia, alpha-mercapto-anthraquinones, alpha-rhodanides, alpha-xanthogenates, alpha-sulfonic acid salt of anthraquinone or alpha-substituted anthraquinone derivatives which may be converted by the action of alkaline polysulphides into alpha-mercapto-anthraquinones.

These so-called anthrathiazoles, thiazoleanthrones, or isothiazoles and derivatives thereof, mentioned above (which possess little or no value as intermediates for vat colors), may be converted by sulphonation into wool dyes.

The reaction takes place according to following formula:

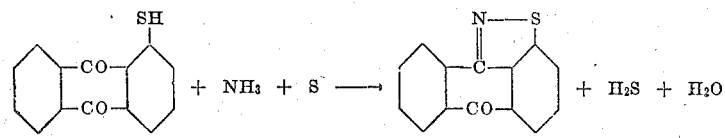

This invention has as an object the production of new and exceptionally valuable intermediates for the preparation of vat colors.

A further object of the invention is the production of these new intermediates by fusing carboxylic acid or aldehyde derivatives of anthraquinone with polysulphide and ammonia. The compounds which it is proposed to use are those that contain in the alpha position a mercaptan group or a group which may be converted by the action of polysulphide into a mercaptan group.

I have discovered that if 1-chlor-anthraquinone-2-carboxylic acid or 1-chlor-anthraquinone-2-aldehyde is heated with sulphur, alkali sulphide and ammonia, 1:9-anthrathiazole-2-carboxylic acid or 1:9-anthrathiazole-2-aldehyde respectively are obtained. These intermediates, though not vat colors themselves, are very valuable for the production of vat colors.

The process is disclosed in detail by the following example. It is to be understood, however, that the reagents, proportions and conditions therein set forth are purely illustrative:

35 parts of 1-chlor-anthraquinone-2-carboxylic acid are heated and stirred with 20 parts of sulphur, 150 parts of sodium sulphide (crystalline), and 400 parts of 10–14% ammonia water to 100° C. in an autoclave for eight hours. The mass is removed from the autoclave, boiled, filtered hot, and washed with hot water, which dissolves almost all the residue. The filtrate is salted out and the sodium salt of the 1:9-anthrathiazole-2-carboxylic acid filtered off, washed with salt water, and dissolved in hot water. The free acid may be precipitated with hydrochloric acid. The new intermediate is a yellow powder, soluble in hot water, easily soluble in alkali, concentrated sulphuric acid and pyridine with a yellow color, and gives with alkaline hydrosulphite a strong violet vat, but has almost no affinity for the cotton fiber. The compound may be illustrated by the following formula:—

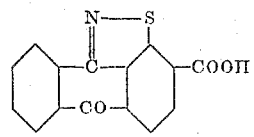

Instead of the 1-chlor-anthraquinone-2-carboxylic acid or aldehyde, respectively, I may employ any anthraquinone-2-carboxylic acid or 2-aldehyde which contains in the 1-position a group which may be converted, by heating with alkaline polysulfide, into the mercapto group.

The new compounds are valuable intermediates for anthraquinone vat colors. For example, 1:9-anthrathiazole-2-carboxylic acid may be converted into the carbonyl chloride by the action of thionyl chloride and condensed with other anthraquinone intermediates as mercapto-amino-anthraquinones or amino-anthraquinones.

The different combinations made with these new intermediates yield a series of new valuable vat colors, of shades varying from yellow to orange.

As many apparently widely different embodiments of this invention may be made without departing from the spirit thereof, it is to be understood that I do not limit myself to the foregoing examples or description except as generally indicated in the claims.

I claim:

1. The process of producing an intermediate of the anthraquinone series, which comprises heating, with alkaline polysulfide and ammonia, an anthraquinone derivative containing, in the 1-position, a group which may be converted, by the action of alkaline polysulfide, into the mercapto group, and containing in the 2-position, a group

in which R represents a radical taken from a group including hydroxyl and hydrogen.

2. The process of producing an intermediate of the anthraquinone series, which comprises heating, with alkaline polysulfide and ammonia, an anthraquinone derivative containing halogen in the 1-position, and containing in the 2-position a group

in which R represents a radical taken from a group including hydroxyl and hydrogen.

3. The process of producing an intermediate of the anthraquinone series, which comprises heating with alkaline polysulfide and ammonia, an anthraquinone-2-carboxylic acid containing, in the 1-position, a group which may be converted, by the action of alkaline polysulfide, into the mercapto group.

4. The process of producing an intermediate of the anthraquinone series, which comprises heating 1-halogen-anthraquinone-2-carboxylic acid with alkaline polysulfide and ammonia.

5. The process of producing an intermediate of the anthraquinone series, which comprises heating 1-chlor-anthraquinone-2-carboxylic acid with alkaline polysulfide and ammonia.

6. The process of producing an intermediate of the anthraquinone series, which comprises heating 1-chlor-anthraquinone-2-carboxylic acid with alkaline polysulfide and ammonia, and converting the resulting 1:9-anthrathiazole-2-carboxylic acid to the carbonyl chloride.

7. As a new product, a compound having most probably the following formula:

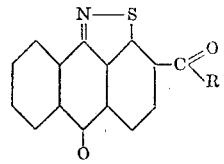

in which R is a member of the group comprising hydrogen and the hydroxyl radical.

8. As a new product, the compound having most probably the following formula:

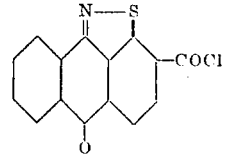

9. As a new product, the compound having most probably the following formula:—

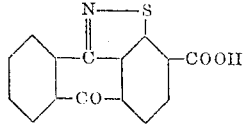

In testimony whereof I affix my signature.

RALPH N. LULEK.